United States Patent
Enakiev et al.

(10) Patent No.: US 8,776,028 B1
(45) Date of Patent: Jul. 8, 2014

(54) VIRTUAL EXECUTION ENVIRONMENT FOR SOFTWARE DELIVERY AND FEEDBACK

(75) Inventors: Anton A. Enakiev, Moscow (RU); Alexander G. Tormasov, Moscow (RU); Alexey B. Koryakin, Moscow (RU); Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 897 days.

(21) Appl. No.: 12/753,860

(22) Filed: Apr. 3, 2010

Related U.S. Application Data

(60) Provisional application No. 61/166,722, filed on Apr. 4, 2009.

(51) Int. Cl.
*G06F 9/44* (2006.01)
*G06F 9/445* (2006.01)
*G06F 11/00* (2006.01)

(52) U.S. Cl.
USPC .............. 717/127; 714/38.11; 714/38.14; 714/48; 714/57; 717/176

(58) Field of Classification Search
None
See application file for complete search history.

(56) References Cited

U.S. PATENT DOCUMENTS

| | | | |
|---|---|---|---|
| 5,355,484 A * | 10/1994 | Record et al. | 717/127 |
| 6,601,192 B1 * | 7/2003 | Bowman-Amuah | 714/38.12 |
| 6,637,024 B1 * | 10/2003 | Johnson et al. | 717/124 |
| 6,654,949 B1 * | 11/2003 | Fraenkel et al. | 717/130 |
| 6,754,889 B1 * | 6/2004 | Leverenz | 717/127 |
| 6,802,054 B2 * | 10/2004 | Faraj | 717/128 |
| 6,993,665 B2 * | 1/2006 | Heddings et al. | 726/21 |
| 7,191,441 B2 * | 3/2007 | Abbott et al. | 718/1 |
| 7,398,433 B2 * | 7/2008 | Benedek et al. | 714/57 |
| 7,506,317 B2 * | 3/2009 | Liang et al. | 717/130 |
| 7,552,419 B2 * | 6/2009 | Zimmer et al. | 717/121 |
| 7,577,951 B2 * | 8/2009 | Partamian et al. | 718/1 |
| 7,613,599 B2 * | 11/2009 | Bade et al. | 703/14 |
| 7,647,589 B1 * | 1/2010 | Dobrovolskiy et al. | 718/1 |
| 7,669,186 B2 * | 2/2010 | Nolan et al. | 717/124 |
| 7,681,089 B2 * | 3/2010 | Ashmore | 714/57 |
| 7,793,266 B2 * | 9/2010 | Alpern et al. | 717/127 |
| 7,844,954 B2 * | 11/2010 | Venkitachalam et al. | 717/130 |
| 7,877,733 B2 * | 1/2011 | Parkinson et al. | 717/127 |
| 7,913,226 B2 * | 3/2011 | Lowell et al. | 717/120 |
| 7,934,202 B2 * | 4/2011 | Messmer et al. | 717/131 |
| 7,970,596 B2 * | 6/2011 | Bade et al. | 703/13 |
| 7,984,304 B1 * | 7/2011 | Waldspurger et al. | 713/187 |
| 8,032,351 B2 * | 10/2011 | Stringham | 703/21 |

(Continued)

OTHER PUBLICATIONS

Orlando et al., Java Virtual Machine Monitoring for Dependability Benchmarking, published by IEEE, 2006 pp. 1-8.*

*Primary Examiner* — Tuan Q. Dam
*Assistant Examiner* — Zheng Wei
(74) *Attorney, Agent, or Firm* — Bardmesser Law Group

(57) ABSTRACT

A method and system for testing and logging execution events of software delivered to a user. The user can launch and run the software product while having the support and a necessary input from the product developer. A software product is provided from a first remote server and executed on a user computer, while execution statistics are collected and analyzed by a second remote server. The software product is used in a virtual execution environment. The software product is executed on a Guest Operating System (GOS) also installed on the user computer. A hypervisor-level monitoring of tested software products and GOSs is implemented.

17 Claims, 4 Drawing Sheets

(56) References Cited

U.S. PATENT DOCUMENTS

| | | | |
|---|---|---|---|
| 8,074,218 B2* | 12/2011 | Eilam et al. | 718/1 |
| 8,091,084 B1* | 1/2012 | Dobrovolskiy et al. | 717/174 |
| 8,121,966 B2* | 2/2012 | Routray et al. | 706/46 |
| 8,127,292 B1* | 2/2012 | Dobrovolskiy et al. | 718/1 |
| 8,145,471 B2* | 3/2012 | Beyer et al. | 703/26 |
| 8,176,488 B1* | 5/2012 | Dobrovolskiy et al. | 718/1 |
| 8,181,159 B2* | 5/2012 | Khalil et al. | 717/124 |
| 8,196,116 B2* | 6/2012 | Peacock et al. | 717/128 |
| 8,209,684 B2* | 6/2012 | Kannan et al. | 718/1 |
| 8,296,734 B2* | 10/2012 | Geppert et al. | 717/124 |
| 8,307,358 B1* | 11/2012 | Koryakina et al. | 717/174 |
| 8,321,842 B2* | 11/2012 | Xu et al. | 717/127 |
| 8,375,386 B2* | 2/2013 | Hendel | 718/1 |
| 8,402,441 B2* | 3/2013 | Budko et al. | 717/127 |
| 8,434,067 B2* | 4/2013 | Nagabhushan et al. | 717/127 |
| 8,522,235 B2* | 8/2013 | Dobrovolskiy et al. | 717/174 |
| 8,539,137 B1* | 9/2013 | Protassov et al. | 711/6 |
| 2002/0002599 A1* | 1/2002 | Arner et al. | 709/219 |
| 2003/0028857 A1* | 2/2003 | Zagorski et al. | 717/124 |
| 2004/0237005 A1* | 11/2004 | Adkisson et al. | 714/55 |
| 2006/0015852 A1* | 1/2006 | Parkinson et al. | 717/126 |
| 2006/0136877 A1* | 6/2006 | Gdaniec et al. | 717/127 |
| 2006/0230320 A1* | 10/2006 | Salvador et al. | 714/38 |
| 2006/0248514 A1* | 11/2006 | Messmer et al. | 717/127 |
| 2007/0006226 A1* | 1/2007 | Hendel | 718/1 |
| 2007/0113218 A1* | 5/2007 | Nolan et al. | 717/124 |
| 2007/0168952 A1* | 7/2007 | Lee et al. | 717/118 |
| 2007/0169005 A1* | 7/2007 | Drepper | 717/131 |
| 2008/0120604 A1* | 5/2008 | Morris | 717/128 |
| 2008/0244525 A1* | 10/2008 | Khalil et al. | 717/124 |
| 2008/0244535 A1* | 10/2008 | Nelson et al. | 717/129 |
| 2009/0055802 A1* | 2/2009 | Crosby | 717/125 |
| 2009/0150885 A1* | 6/2009 | Safari et al. | 718/1 |
| 2009/0249284 A1* | 10/2009 | Antosz et al. | 717/104 |
| 2009/0307166 A1* | 12/2009 | Routray et al. | 706/46 |
| 2009/0313606 A1* | 12/2009 | Geppert et al. | 717/124 |
| 2010/0192020 A1* | 7/2010 | Van Riel et al. | 714/38 |
| 2010/0229158 A1* | 9/2010 | Ike | 717/128 |
| 2010/0251219 A1* | 9/2010 | Peacock et al. | 717/128 |
| 2011/0004935 A1* | 1/2011 | Moffie et al. | 726/23 |

* cited by examiner

VIRTUAL EXECUTION ENVIRONMENT FOR SOFTWARE DELIVERY AND FEEDBACK

CROSS-REFERENCE TO RELATED APPLICATION

This application is a non-provisional application of U.S. Provisional Patent Application No. 61/166,722, filed Apr. 4, 2009, entitled VIRTUAL EXECUTION ENVIRONMENT FOR SOFTWARE DELIVERY AND FEEDBACK, incorporated by reference herein in its entirety.

BACKGROUND OF THE INVENTION

1. Field of the Invention

The present invention relates to software distribution, and more particularly, to a method, system and computer program product for delivering software and providing a feedback in a virtual execution environment.

2. Background Art

Complex software systems and modules need to be installed and tested in a real working environment. Typically, a beta version of a software product is installed on a client system for testing. During software product beta testing, it is important to collect and analyze customers' feedback. Based on the customers' feedback, the bugs can be detected and fixed. An overall quality of the software product can be improved based on the customers' experience. In particular, issues such as stability, usability, scalability, etc., can be addressed.

The industry trend of virtualization and isolation of computer system resources presents some additional challenges in terms of beta testing. A Virtual Machine (VM) is a type of an isolated Virtual Environment where multiple VMs can run on the same physical machine simultaneously. Each VM instance has a set of its own software components (including OS) and uses hardware modules of the physical machine where the VM resides.

Often, there are multiple VMs running on a host operating system. In such system, some resources of the host operating system are isolated and allocated for running each of the VMs. With Virtual Machine (VM) technology, a user can create and run multiple virtual environments on a server at the same time. Each virtual environment, such as a VM, requires its own Guest Operating System (GOS) and can run applications independently.

However, there are certain software defects of the applications or the GOSs that are difficult to detect, identify and report. There are also a number of defect types that are difficult to detect, identify and report. For example:
- OS kernel "hangs;"
- OS crashes without generation of a crash dump;
- system service "hangs"; and
- situations when an error report cannot be generated and sent.

The above situations can lead to important data being missed. This data is needed for analyzing and fixing the defects of the application being tested.

Accordingly, there is a need in the art for a method and system for comprehensive testing of software products in a virtual execution environment that provide detection of advanced system errors and generation of error reports.

SUMMARY OF THE INVENTION

The present invention is directed to a system, method and computer program product for delivering software product and providing a feedback in virtual execution environment (VEE) that substantially obviates one or more of the problems and disadvantages of the related art.

An exemplary embodiment provides a method and system for testing and logging execution events of software delivered to a user. The user can launch and run the software product while having the support and a necessary input from the product developer. According to the exemplary embodiment, a software product is provided from a first remote server and executed on a user computer, while execution statistics are collected and analyzed by a second remote server.

In the exemplary embodiment, a software product is used in a virtual execution environment. Therefore, the software product is executed on a Guest Operating System (GOS) of a VM also installed on the user computer. A hypervisor-level monitoring of tested software products and GOSs is implemented. The hypervisor has a full control of a GOS and can provide advanced system errors handling and state reports otherwise not available through conventional beta testing.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
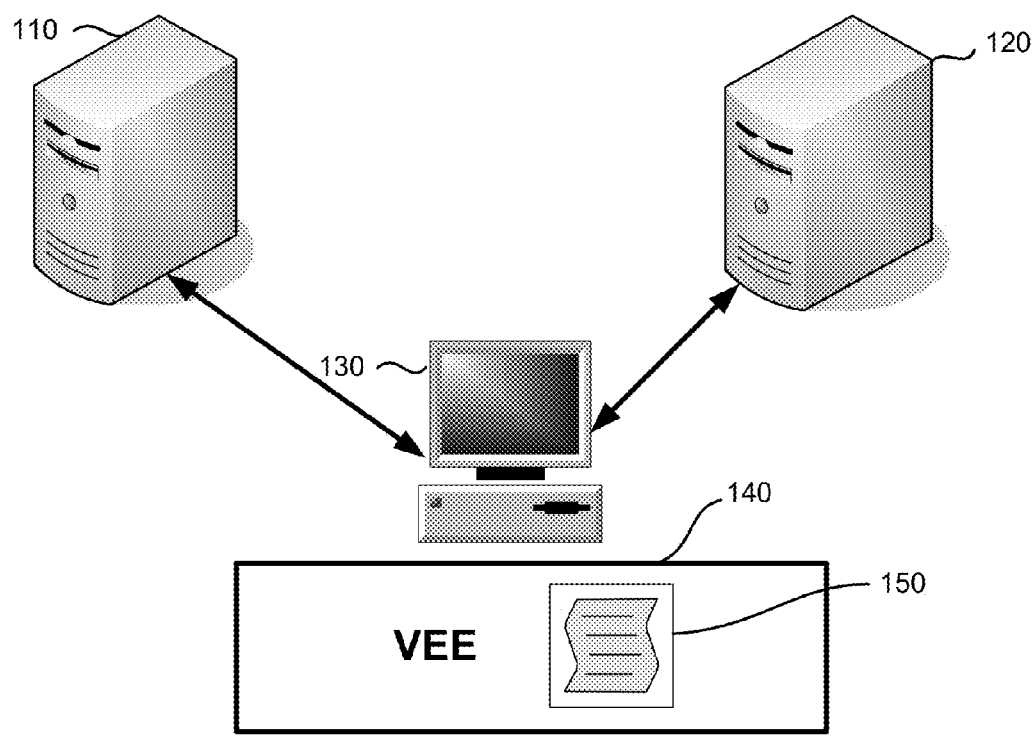
FIG. 1 illustrates a system architecture in accordance with an exemplary embodiment.

Reference will now be made in detail to the embodiments of the present invention, examples of which are illustrated in the accompanying drawings.

The present invention is therefore directed to a method and system for delivering software products, and to remote testing and logging execution events of the software product in a virtual execution environment. A remote user installs and runs a software product, e.g. Parallels Desktop 5 for Mac or Parallels Desktop 5 for Windows on its computer, while having the support and a necessary input from the product developer. According to the exemplary embodiment, the software product is provided from a first remote server and executed on a user computer, while execution statistics are collected and analyzed by either the first or a second remote server.

The present invention is applicable, for example, to testing of third party software, particularly operating systems and other relatively complex software products. Capabilities of Virtual Machines (VMs) can be used to enhance and expand the error reporting capabilities of user side testing. For example, the Virtual Machine snapshotting capabilities can be used to save a snapshot of a VM just prior to a software failure or crash (i.e., failure of the software that is being tested).

As another option for better performance of the system, a new VM can be launched for a user instead of a crashed one. It can be a VM with the same configuration or with an already patched (based on analysis of the crash) configuration. Alternatively, the new VM can be the same system started from a predefined secure or trusted point. Also, error reporting can be used to indicate the differences and changes since the last recorded snapshot of the Virtual Machine. Also, note that various operating system and other VM files can be provided either in the Virtual Machine itself, or as links to other Virtual Machines, or to the host operating system files (if the OS is the same, obviously), with appropriate protection mechanisms, such as copy-on-write (COW) and/or page protection fault mechanisms.

The vendor of the software can provide the software already encapsulated in the Virtual Machine, together with all the needed files. Installation can be performed such as described, for example, in U.S. patent application Ser. No. 12/143,570, filed on 20 Jun. 2008, entitled METHOD AND SYSTEM FOR UNATTENDED INSTALLATION OF GUEST OPERATING SYSTEM, incorporated herein by reference.

User actions and system operations prior to the crash can be recorded as described in the above-mentioned application. This data can be used for step-by-step analysis of a cause of failure or other malfunction of the tested software. In this case, the steps leading to a crash, along with a limited set of data, can be sufficient, instead of a full system dump.

The limited set of data can include, for example, processor registers, memory pages assigned to the VM being mapped (and might not include memory pages being unmapped). As another example, a system dump can be created before starting user activity and all I/O operations (i.e., system calls, interrupts, error reports and similar predefined events) can be recorded and included into report for further execution of the VM from the moment of creation of a dump. In this case system dump or snapshot created before user activity may be applied to computing system or common system configuration may be used for setting up computing system. Then "replaying" of the user environment may be implemented where reports are collected, by applying recorded and reported user and system actions. Such a "replay", e.g., with assistance of debugging tools can help to expose inherent software shortcomings and makes further improvements easier. Event logs or reports can help imitate behavior of user virtual environment, application or even process before critical event, e.g., a crash or deadlock or similar. The event log may be provided for a single virtual environment, a single application, a single process or for a plurality of software modules, or any combination thereof. Steps related either to whole virtual machine or to single application may be used for creating the report, or alternatively, these steps may be extracted from the common report. In those cases data sets required for collecting and including in the report may be defined (either prior to or in the process of extraction data). These requirements may also be concerned to initial snapshot amount, memory pages allocations, activities of predefined processes, and so on.

As yet a further option, various tools can be employed to ensure that the image of the Virtual Machine that is installed on the hard disk is as identical as possible to a "master image" maintained by the vendor. While this may not always be possible for all of the files of the Virtual Machine, it is still possible for a large majority of the files.

This way, when providing a copy of the snapshot of the crashed Virtual Machine to the vendor, the entire snapshot (which is fairly large, in terms of the disk space that it occupies) need not be provided to the vendor, but only the difference between the "master snapshot" and the final state of the Virtual Machine before the crash (or some state earlier than that, if the final state is not available). Thus, the vendor will have a much easier time recreating the conditions that led to the software failure.

Additionally, driver verification tools can be provided, in the same manner. The software product is executed on a Guest Operating System (GOS) of the VM also installed on the remote user computer. A hypervisor-level monitoring of tested software products and GOSs is performed. The hypervisor has a full control of a GOS and provides advanced system errors and state reports for the software product developer.

A user (i.e., an enterprise) needing to run new software receives a special software installation, configuration and monitoring product. This product is encapsulated as a part of a virtual environment (VE), the VM being one example of such a VE. Thus, the software product is installed and configured not from a CD, but from component encapsulated inside the VM. Component encapsulation, in this context, means that a component required for the software installation is a part of the VM, e.g., has a format specific for the VM and does not require external (to the VM) software support. Encapsulated software is relatively secure for the host system.

This product can generate comprehensive execution reports. The configuration and monitoring product of the exemplary embodiment can be used on all of user computers throughout the enterprise network. Also, the system OS snapshots can be produced so that the OS can be restored in case of system crashes caused by the software being tested.

The software configuration and monitoring module is implemented in a virtual execution environment (VEE), such as, for example a Virtual Machine (VM).

In one embodiment, only two computers are involved in software configuration and monitoring—a remote enterprise server and a local user computer. Accordingly, a user is provided with a container with a software product to be configured and tested. The container also has means for supporting functionality of the VEE. It also contains the parameters of the VEE.

Installation of the software product to be tested can be implemented according to the U.S. patent application Ser. No. 12/143,570 entitled "METHOD AND SYSTEM FOR UNATTENDED INSTALLATION OF GUEST OPERATING SYSTEM" (now U.S. Pat. No. 8,307,358), incorporated by reference herein. In one embodiment a method described in the Provisional Application No. 61/056,084, entitled "METHOD AND SYSTEM FOR DATA BACKUP WITH CAPACITY AND TRAFFIC OPTIMIZATION", incorporated by reference herein, can be used.

In this case, a network connection and a network mass storage are used in an optimal manner for uploading a VM (with encapsulated components) to a user computing system and further running the VM after completed upload or from the partially uploaded components. The uploading and deployment of software can be executed with user assistance or in a fully automated mode.

The software product distribution inside a VM and/or along with a VM can be implemented in accordance with a method described in the U.S. patent application Ser. No. 12/050,409, entitled "SYSTEM AND METHOD FOR RESTORATION OF AN EXECUTION ENVIRONMENT FROM HIBERNATION INTO A VIRTUAL OR PHYSICAL MACHINE" (now U.S. Pat. No. 8,166,477) where hardware independent product distribution is required and deployment of security services is required for feedback services, as described in the U.S. patent application Ser. No. 12/556,233, entitled "METHOD AND SYSTEM FOR ADMINISTRATION OF SECURITY SERVICES WITHIN A VIRTUAL EXECUTION ENVIRONMENT (VEE) INFRASTRUCTURE" (now U.S. Pat. No. 8,074,276) incorporated by reference herein.

In order to install the software product, a user can receive a set of tools needed for secure data processing and then establish a secure connection for accessing the enterprise web cite as described in the U.S. patent application Ser. No. 12/340,903, entitled "ACCESSING A REMOTE VIRTUAL ENVIRONMENT WITHOUT USER AUTHENTICATION" incorporated by reference herein. In this disclosure, the remote virtual environment is used for processing data.

In one embodiment, testing and configuration procedures can be implemented on a company-wide or other local web site for limiting network traffic and/or for security considerations. For example, an administrative application being installed and running on the enterprise server can collect feedback information from a number of users and then send collected data to a software vendor (in encoded and/or pooled, i.e., impersonal form). The configuration is performed based on user requirements or based on a test procedure. Thus, before the user is provided a software product to be tested, special drivers and program modules can be installed on the user computer. The drivers can be installed as a part of the Virtual Environment, such as a Virtual Machine (VM).

Installation procedure is provided in U.S. patent application Ser. No. 12/143,570, entitled "METHOD AND SYSTEM FOR UNATTENDED INSTALLATION OF GUEST OPERATING SYSTEM" (now U.S. Pat. No. 8,307,358) incorporated by reference herein. In one embodiment, in addition to implementation of the VEE and the monitoring means, the VEE is provided with a hypervisor which can perform periodical snapshotting. The snapshotting can include instructions executed in the VEE. The logged instructions can be used for analyzing the states of the software product between the snapshots.

In the VEE described herein can be supported by a lightweight hypervisor, a virtual machine monitor or a hosted virtual machine monitor (VMM) or the like. Continuous data protection (CDP) means can be used. For example, the CDP applications that monitor hardware support and services provided to the software product being tested by the VEE. The CDP applications can also monitor the services provided by the Guest OS (or a Host OS) to the VEE.

Note that the hardware can be in a form of a client type device, or it can be an emulated virtual device or device connected to a VM over the network having "look and feel" of a local device. Such a device is described in the Provisional Application No. 61/031,932, entitled "METHOD AND SYSTEM FOR REMOTE DEVICE ACCESS," incorporated by reference herein. In this disclosure, multiple users or testers can test a system with the same hardware being made in limited quantities.

In one embodiment, system driver verification can be performed at a time of the snapshot. The verification can be performed to detect version of a driver in order to determine whether the driver provides required functions or the driver meets user needs. Alternatively, a commercially available driver verifier by Microsoft™ can be used.

As another example, simple verification of signature may be applied. The verification results can be sent to the enterprise server along with the snapshot and report about the system state. The snapshot, in accordance with the exemplary embodiment, can include data related to special memory regions. For example, a snapshot can include a screen shot of an output device, a state of a device memory (such as a USB port), system registry, a state of processor registers, etc.

The snapshot data can reflect real as well as virtual devices. For example, it can reflect a video memory of a real video card or an emulated video memory (based on the real video card). According to the exemplary embodiment, prior to snapshot generation, the system can be frozen and a VEE debugger can be launched. Thus, the monitoring application provides the enterprise server with a comprehensive report about the state of devices at a point of critical errors.

Note that the monitoring application of the exemplary embodiment can monitor a local devices as well as virtual devices accessible over the network. For comprehensive testing some devices can be implemented on the enterprise servers or on the third party servers. The VEE support means can have a direct access to devices, including remote virtual devices.

The monitoring application, in accordance to the exemplary embodiment, determines the state of all devices at a given moment, including a critical system crash or a snapshot time. For snapshot generation, the system is brought into a stable connected state. For example, if a computer cluster is used for the VEE implementation, all nodes of the cluster can be configured in such a way that they can be re-launched together when restored from the snapshot.

The monitoring application can track user actions and all calls to the software product being tested made by hardware or other applications. This data can be included in the report along with the snapshots. A user can also create a separate block of comments where he can log his actions and corresponding reactions by the software product being tested. The user can also make comments in regard to the application interface, speed, stability, etc.

In one embodiment, the monitoring application has feedback means that can interact in real time with the software product being tested and with the VEE where the software is executed. A remote helper can be implemented for interrupting installation or execution of the software in critical situations. Additionally, operators or a remote server can perform debugging for detecting and solving the problems.

Also, analysis of the VEE can be performed on the user computer automatically and the drivers can be loaded and installed as needed. Code patching can be done in a real time as described in the U.S. Pat. No. 7,472,384, entitled "SYSTEM, METHOD AND COMPUTER PROGRAM PRODUCT FOR ON-THE-FLY PATCHING OF EXECUTABLE CODE," incorporated by reference herein.

In one embodiment, the software update can be performed without user input, for example, by the remote server. The software product that is being tested can have limited time or capabilities license key (for example, one month or a limited set of features). In some cases, the vendor can check program execution in an online mode, and also provide above mentioned or other required restrictions in an online mode, for example, for safe execution of a program build or release provided to the user.

If software capabilities are changed by vendor initiative, they may be also improved as well by online update of drivers or software modules, additional hardware previously inaccessible may be added or other "hot" updates may be provided to a user. The hardware may be real hardware and/or virtual hardware supported by a virtual machine monitor (VMM). Also, the vendor initiative for program update may be a result of online debugging of the software.

The basic images of the VEE and of the software can be made generic and then be configured for each user on the remote server. Also, some configurations can be made on the user computer after the generic VEE image and or software image is loaded. After the image is loaded, some of its parts (i.e., files) can be placed into allocated areas of a storage device. Data encryption means can also be used.

Additionally, when the OS is blocked inside the VEE that is not executed on this OS (i.e., live lock), the debugging means can be launched. Some debugging means can be implemented by the remote server as described in the U.S. Pat. No. 7,383,327 entitled "MANAGEMENT OF VIRTUAL AND PHYSICAL SERVERS USING GRAPHIC CONTROL PANELS" incorporated by reference herein.

A report reflecting the detected problems and solutions used is generated. The remote server can send the commands to the user computer for fixing and configuring the software product. The exemplary embodiment provides an "Installation Assistant" feature that helps users to install guest operating system in "one click" without requiring any information. The "Installation Assistant" has all data needed to install a GOS inside a VM.

For example, if the "Installation Assistant" feature is integrated with an automatic Tested Operating System ISO image downloaded module, the server can announce "Try Operating System beta" program. Then, a user fills out a web form registration for a beta program, and, in one click, the "Installation Assistant" automatically downloads and installs an Operating System without asking any further questions from the user.

The exemplary embodiment also provides Guest OS (GOS) error reporting feature. Using sophisticated analyzing in a hypervisor, the exemplary embodiment can automatically trace a state of the tested Guest OS and generate the Guest OS error report using a standard error reporting format (e.g., Windows Error Reporting format and data reporting protocols).

The following is an example of possible Tested GOS state checks:

There are no interrupts in monitor from the GOS;
"int 2c" interrupts from Tested GOS kernel (special Operating System kernel assert);
Watchdog driver/process that sends "keepalives" to a hypervisor; and
Tested GOS processes monitoring.

The hypervisor has a full access to the GOS memory, processor registers, etc. It allows to collect all the required information about operating system state at the hypervisor level:

Registers;
Call stacks for each processor;
GOS physical memory: kernel space and user space (optionally);
Paging file content.

In the exemplary embodiment, a system crash report can be generated in a standard Windows memory dump format:
a mini dump;
a kernel memory dump; and
a full system dump.

Additionally, any other formats, either known for Linux OS (full dump or incremental dump), Mac OS or other operating systems can be used. Also, proprietary formats can be applied. Exemplary principles and requirements to specific dump formats are described above.

FIG. 1 illustrates system architecture in accordance with the exemplary embodiment. A software product 150 is provided from a remote server 110 (i.e., a software vendor) to a user computer 130. A VEE 140 is implemented on the user computer 150. The software product 150 is launched in the VEE 140. The execution statistics of the software product 150 are collected and analyzed by a remote server 120.

Figure 2:
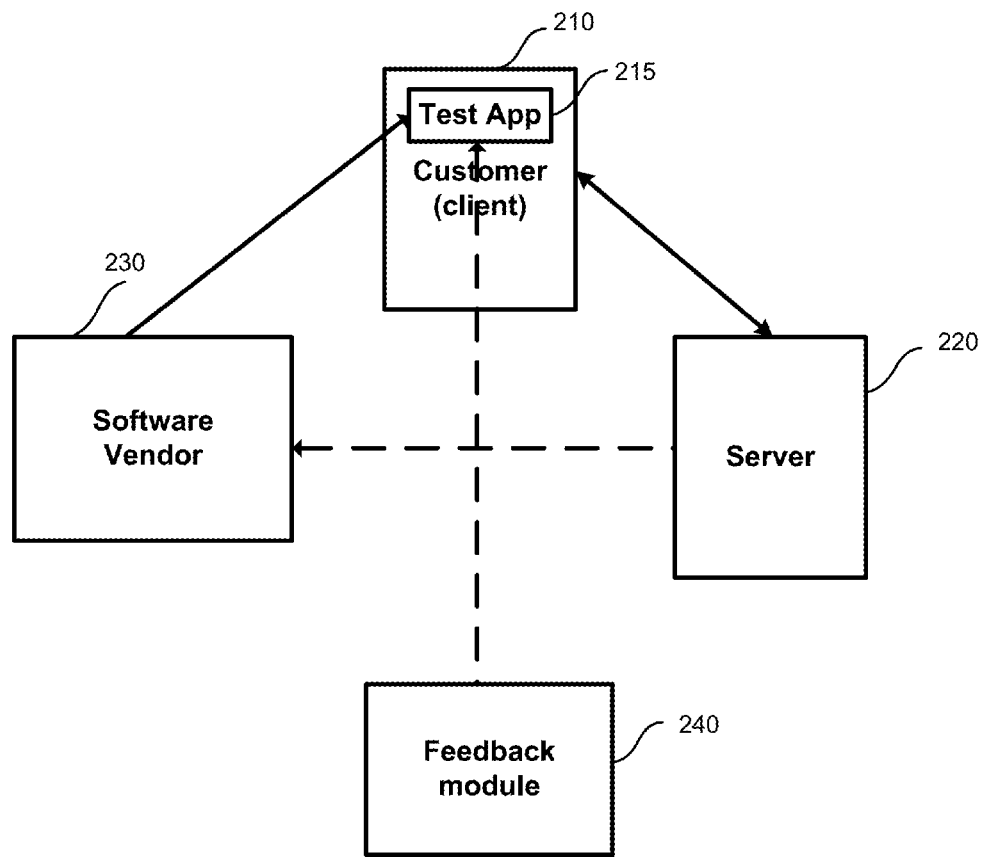
FIG. 2 illustrates a client-server architecture in accordance with an exemplary embodiment.

FIG. 2 illustrates a client-server system in accordance with the exemplary embodiment. Software vendor 230 provides a test application 215 to client 210. A feedback module 240 monitors virtual environment on the client 210. The test application 215 is executed in a virtual environment running on the client 210. A server 220 collects the execution statistics from the client 210 and provides reports back to the vendor 230.

Figure 3:
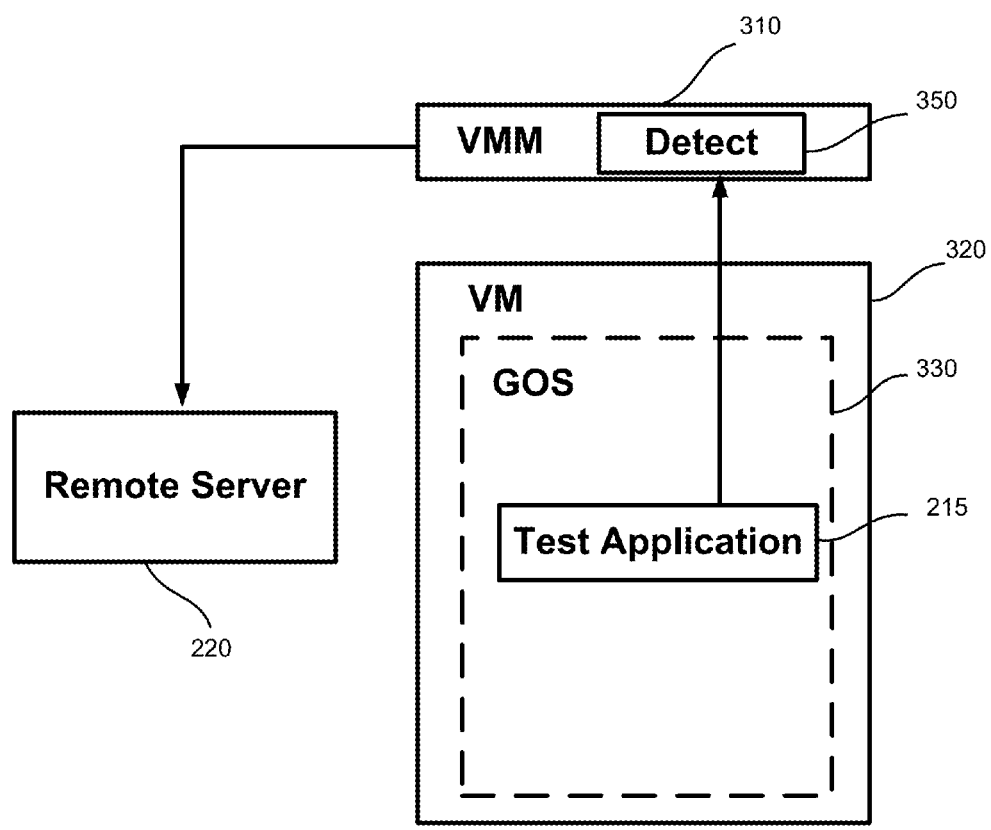
FIG. 3 illustrates a structure of a virtual execution environment in accordance with an exemplary embodiment.

FIG. 3 illustrates a structure of a virtual execution environment in accordance with an exemplary embodiment. A virtual machine 320 is implemented on a client 210 (see FIG. 2). A test application 215 is executed on a guest operating system (GOS) 330. A virtual machine monitor (VMM) 310 monitors execution of the test application 215 and all abnormalities are detected and recorded by a detect module 350 within the VMM 310. A special VM service can be used to notify a detect module, if the VM crashes. The VMM 310 performs memory dumps onto a remote server 220 in case crashes of the GOS 330.

According to the exemplary embodiment, the VMM 310 also provides periodic reports to the server 220 even if crashes do not occur. Alternatively, reports can be provided on demand.

A report can contain data related to power saving applications. Typically, generation of a time diagram of active tasks or instructions requires high power consumption of a processor. The report can include a time diagram of modes of the processor, e.g. "active", "sleep", "idle", "low frequency rate" or a like. Also, usage of other computer hardware can be analyzed (e.g., influence of active tasks on high power consuming modes can be analyzed).

For example, it can be a start of hard disk drive (HDD) (up to speed), Graphic Processing Unit overloading, or other related processes. Results of the analysis can be used for optimal scheduling of stand-alone applications or of VM tasks and/or scheduling of the entire computing system. Note that in terms of energy savings, it is better to keep the HDD or other mechanical device in an active state instead of performing frequent start/stop operations.

Figure 4:
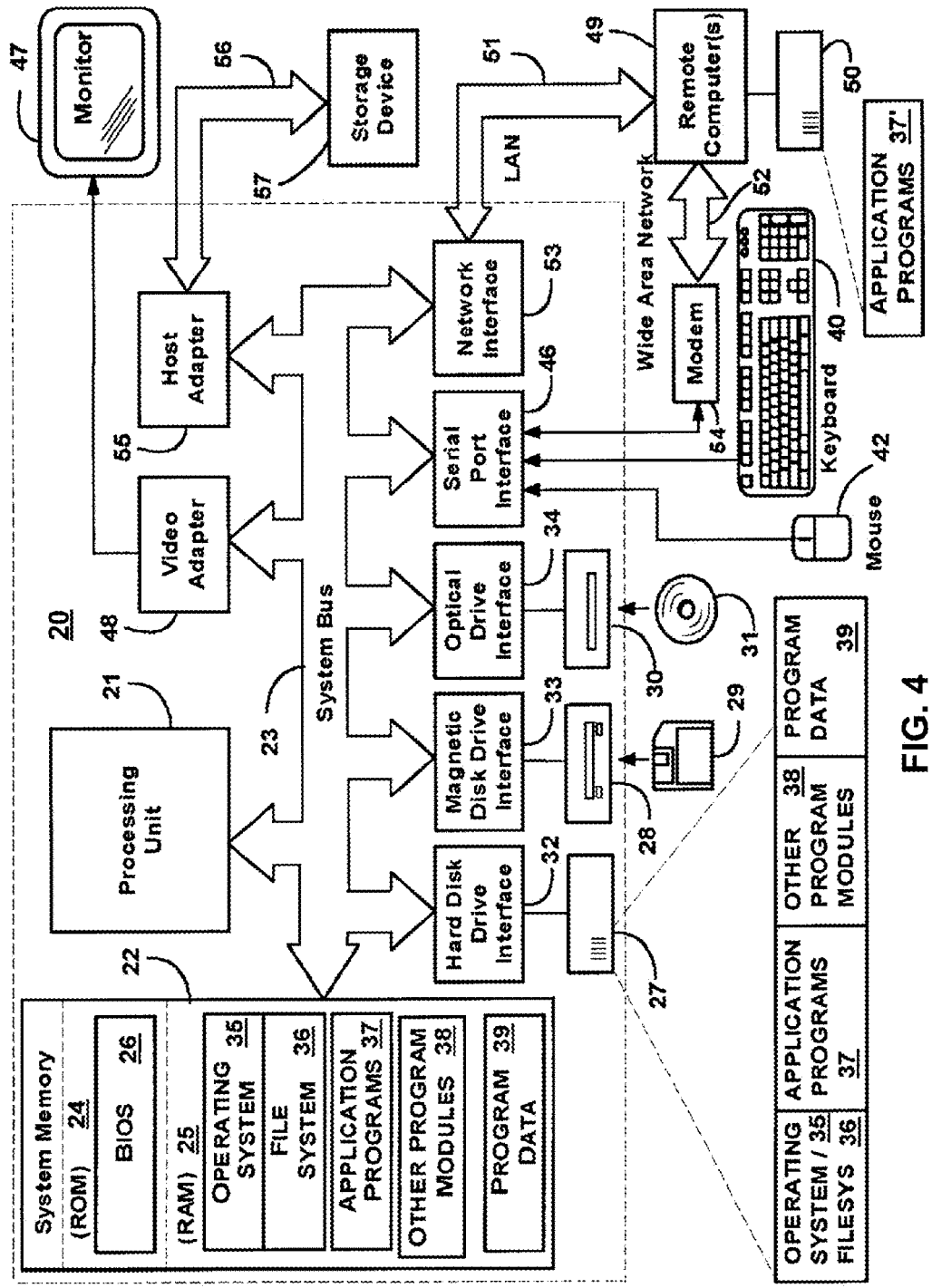
FIG. 4 illustrates an exemplary computer or a server system on which the exemplary embodiment can be implemented.

With reference to FIG. 4, an exemplary computer system, where the exemplary embodiment can be implemented, includes a general purpose computing device in the form of a user-side computer and/or server-side computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 20, such as during start-up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment of a system and method for distribution of software product and for providing a feedback in virtual execution environment, it should be apparent to those skilled in the art that certain advantages of the described method and apparatus have been achieved.

In particular, it should be appreciated by those skilled in the art that system and method described in the preferred embodiment provides for an efficient testing and configuration of the software products without missing any performance-related information. It should also be appreciated that various modifications, adaptations, and alternative embodiments thereof may be made within the scope and spirit of the present invention. The invention is further defined by the following claims.

What is claimed is:

1. A method for testing a new software product in a virtual machine, the method comprising:
    installing a host operating system on a user computer;
    installing a Virtual Machine Monitor (VMM) on the user computer;
    installing a Virtual Machine (VM) to run under control of the VMM on the user computer, wherein the VMM has a privilege level at least as high as the host operating system of the user computer to access memory pages assigned to the VM being mapped and handles exceptions generated within the VM;
    loading a software product onto the user computer from a component encapsulated inside the VM via a first server;
    launching the software product in the VM;
    using the VMM to monitor software product execution and to log software product execution data;
    using the VMM to generate an incremental snapshot relative to a master snapshot of the VM;
    using the VMM to generate a software product execution report; and
    using the VMM to provide the software product execution report to a second server,
    wherein the software product execution report includes the incremental snapshot of the VM.

2. The method of claim 1, wherein the snapshot comprises a state of the VM prior to crash.

3. The method of claim 1, wherein the monitoring of the software product execution is performed by the VMM.

4. The method of claim 3, wherein the VMM has a detect module for detecting VM crashes.

5. The method of claim 1, wherein the report comprises information related to the user actions.

6. The method of claim 1, wherein the report comprises information related to power saving applications.

7. The method of claim 1, wherein VMM includes any of:
    continuous data protection means;
    driver verification tools;
    instruction trace log; and
    state capture means.

8. A computer useable non-transitory storage medium having computer program logic stored thereon for executing on a processor for implementing the steps of claim 1.

9. A system for testing a test application, the system comprising:
    a client computer connected to a remote server;
    a virtual machine (VM) implemented on the client;
    a guest operating system (GOS) running on the VM;
    a test application executed on the (GOS);
    a virtual machine monitor (VMM) controlling the VM and having a detect module, wherein the VMM has a privilege level at least as high as a host operating system of the client computer to access memory pages assigned to the VM being mapped and wherein the VMM handles exceptions generated within the VM, and
    wherein:
        the test application is loaded onto the client computer from a component encapsulated inside the VM via a first server;
        execution of the test application is monitored by the VMM;
        user actions, system operations and VM crashes are detected by the detect module within the VMM;
        the VMM generates a test application report;

the VMM generates an incremental snapshot relative to a master snapshot of the VM; and the VMM transmits the test application report and the incremental snapshot of the crashed VM, at a moment prior to the crash, to the remote server.

10. The system of claim 9, wherein the VMM provides execution statistics of the test application and of the VM to the remote server.

11. The system of claim 10, wherein the execution statistics comprise snapshots of the VM prior to crash.

12. The system of claim 10, wherein the execution statistics comprise user action-related data.

13. The system of claim 9, wherein the snapshot includes contents of video memory.

14. The system of claim 9, wherein the snapshot includes a screenshot.

15. The system of claim 9, wherein the snapshot includes a state of virtual peripheral devices.

16. The system of claim 9, wherein the snapshot includes a paging file contents.

17. The system of claim 9, wherein the snapshot includes a call stack.

\* \* \* \* \*